(12) United States Patent
Song et al.

(10) Patent No.: US 10,852,027 B2
(45) Date of Patent: Dec. 1, 2020

(54) AIR CONDITIONING SYSTEM

(71) Applicant: LG ELECTRONICS INC., Seoul (KR)

(72) Inventors: Chiwoo Song, Seoul (KR); Pilhyun Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1 day.

(21) Appl. No.: 15/765,014

(22) PCT Filed: Sep. 12, 2016

(86) PCT No.: PCT/KR2016/010303
§ 371 (c)(1),
(2) Date: Mar. 30, 2018

(87) PCT Pub. No.: WO2017/057861
PCT Pub. Date: Apr. 6, 2017

(65) Prior Publication Data
US 2018/0259218 A1     Sep. 13, 2018

(30) Foreign Application Priority Data
Oct. 1, 2015   (KR) .................. 10-2015-0138401

(51) Int. Cl.
*F24F 11/86* (2018.01)
*F25B 41/04* (2006.01)
(Continued)

(52) U.S. Cl.
CPC .............. *F24F 11/86* (2018.01); *F24D 5/12* (2013.01); *F24F 11/00* (2013.01); *F24F 13/24* (2013.01);
(Continued)

(58) Field of Classification Search
CPC .............. F25B 40/02; F25B 2313/007; F25B 2400/13; F25B 2600/2513;
(Continued)

(56) References Cited

U.S. PATENT DOCUMENTS 6,918,264 B2 * 7/2005 Park .................. F25B 13/00
62/160
7,171,818 B2 * 2/2007 Oh .................. F25B 13/00
62/113
(Continued)

FOREIGN PATENT DOCUMENTS

GB        2273763 A * 6/1994 ............... F25B 7/00
JP        2007-051841      3/2007
(Continued)

OTHER PUBLICATIONS

International Search Report (with English Translation) and Written Opinion dated Dec. 22, 2016 issued in Application No. PCT/KR2016/010303.

(Continued)

*Primary Examiner* — Jianying C Atkisson
*Assistant Examiner* — Miguel A Diaz
(74) *Attorney, Agent, or Firm* — KED & Associates LLP

(57) ABSTRACT

An air conditioning system including one or more supercooling heat exchangers, a supercooling expansion device, a temperature sensor, and a pressure sensor so as to measure and control a current supercooling degree value of a fluid coolant flowing between a fluid pipe and a plurality of indoor devices.

11 Claims, 5 Drawing Sheets

(51) Int. Cl.
*F25B 49/02* (2006.01)
*F24F 11/00* (2018.01)
*F25B 40/02* (2006.01)
*F24F 13/24* (2006.01)
*F24D 5/12* (2006.01)

(52) U.S. Cl.
CPC .............. *F25B 40/02* (2013.01); *F25B 41/04* (2013.01); *F25B 49/02* (2013.01); *F25B 2313/007* (2013.01); *F25B 2313/0231* (2013.01); *F25B 2400/13* (2013.01); *F25B 2600/2509* (2013.01); *F25B 2700/191* (2013.01); *F25B 2700/195* (2013.01); *F25B 2700/2103* (2013.01); *Y02B 30/13* (2018.05)

(58) Field of Classification Search
CPC .......... F25B 2700/191; F25B 2700/195; F25B 2700/2103; F25B 2700/21163; F25B 40/00; F25B 41/04; F25B 41/043; F25B 41/06; F25B 41/062; F25B 2600/2509; F25B 2700/197; F28F 2260/02; F24F 11/80; F24F 11/83; F24F 11/84; F24F 13/30
See application file for complete search history.

(56) References Cited

U.S. PATENT DOCUMENTS

| | | | | |
|---|---|---|---|---|
| 7,343,751 | B2* | 3/2008 | Kates | F24F 3/1603 62/129 |
| 7,805,961 | B2* | 10/2010 | Choi | F25B 13/00 62/324.6 |
| 8,302,413 | B2* | 11/2012 | Kawano | F25B 13/00 62/159 |
| 9,605,862 | B2* | 3/2017 | Eguchi | F24F 1/32 |
| 9,651,283 | B2* | 5/2017 | Eguchi | F25B 41/04 |
| 10,267,540 | B2* | 4/2019 | Minami | F25B 49/02 |
| 10,317,113 | B2* | 6/2019 | Song | F25B 5/02 |
| 2004/0134205 | A1* | 7/2004 | Park | F25B 13/00 62/151 |
| 2004/0134215 | A1* | 7/2004 | Park | F25B 13/00 62/324.1 |
| 2006/0137381 | A1* | 6/2006 | Choi | F25B 13/00 62/324.1 |
| 2008/0092572 | A1 | 4/2008 | Kim | |
| 2009/0255284 | A1 | 10/2009 | Yoshimi | |
| 2010/0101256 | A1* | 4/2010 | Kawano | F25B 13/00 62/324.6 |
| 2015/0300666 | A1* | 10/2015 | Kawano | F25B 30/02 62/324.1 |
| 2016/0131376 | A1* | 5/2016 | Yoon | F24F 11/83 62/86 |
| 2016/0341450 | A1* | 11/2016 | Minami | F25B 49/022 |
| 2016/0356516 | A1* | 12/2016 | Eguchi | F24F 1/32 |
| 2016/0377332 | A1* | 12/2016 | Eguchi | F25B 41/04 62/324.6 |
| 2017/0089623 | A1* | 3/2017 | Kamitani | F16K 51/00 |
| 2017/0108250 | A1* | 4/2017 | Song | F25B 5/02 |
| 2018/0259218 | A1* | 9/2018 | Song | F24F 11/86 |
| 2018/0340700 | A1* | 11/2018 | Chen | F25B 41/04 |
| 2019/0063792 | A1* | 2/2019 | Kim | F25B 49/02 |
| 2019/0287147 | A1* | 9/2019 | Ingale | F25B 49/022 |
| 2020/0011547 | A1* | 1/2020 | Hong | F25B 41/003 |

FOREIGN PATENT DOCUMENTS

| | | |
|---|---|---|
| KR | 10-2006-0029490 | 4/2006 |
| KR | 10-2006-0098051 | 9/2006 |
| KR | 10-2007-0018419 | 2/2007 |
| KR | 10-2010-0063173 | 6/2010 |
| WO | WO 2008/114952 | 9/2008 |

OTHER PUBLICATIONS

European Search Report dated May 16, 2019 issued in EP Application No. 16852008.8.

* cited by examiner

AIR CONDITIONING SYSTEM

CROSS-REFERENCE TO RELATED PATENT APPLICATIONS

This application is a U.S. National Stage Application under 35 U.S.C. § 371 of PCT Application No. PCT/KR2016/010303, filed Sep. 12, 2016, which claims priority to Korean Patent Application No. 10-2015-0138401, filed Oct. 1, 2015, whose entire disclosures are hereby incorporated by reference.

BACKGROUND

1. Field

An air conditioning system is disclosed herein.

2. Background

An air conditioning system is an apparatus for maintaining the air of a predetermined space in a suitable condition according to usage and purposes thereof. In general, the air conditioning system includes a compressor, a condenser, an expansion device and an evaporator, and may cool or heat the predetermined space by performing a refrigeration cycle for performing compression, condensing, expansion and evaporation of refrigerant.

The predetermined space may be changed according to a place where the air conditioning system is used. For example, if the air conditioning system is disposed in home or office, the predetermined space may be an indoor space of a house or a building. In contrast, when the air conditioning system is disposed in a vehicle, the predetermined space may be a boarding space in which a person rides.

When the air conditioning system performs a cooling operation, an outdoor heat exchanger provided in an outdoor unit performs a condenser function and an indoor heat exchanger provided in an indoor unit performs an evaporator function. In contrast, when the air conditioning system performs a heating operation, the indoor heat exchanger performs a condenser function and the outdoor heat exchanger performs an evaporator function.

FIG. 1 is a diagram showing the configuration of a conventional air conditioning system. Referring to FIG. 1, the conventional air conditioning system 10 may perform only a cooling or heating operation or may simultaneously perform cooling and heating operations. The conventional air conditioning system 10 includes an outdoor unit or device 11 including a compressor and an outdoor heat exchanger, a distribution unit (or distributor) 12 connected to the outdoor unit 11, and one or more indoor units or devices 13, 14 and 15 connected to the distribution unit 12 and each including an indoor heat exchanger. Specifically, the one or more indoor units may include a first indoor unit or device 13, a second indoor unit or device 14 and a third indoor unit or device 15.

Performing only the cooling or heating operation means that the one or more indoor units all perform the cooling operation or the heating operation. Such an operation method is defined a cooling-only operation or a heating-only operation.

In addition, simultaneously performing the cooling and heating operations means that some of the one or more indoor units perform the cooling operation and the remaining indoor units perform the heating operation. Such an operation method is defined as a simultaneous cooling-heating operation or simultaneous operation. In addition, in the simultaneous cooling-heating operation, an operation method in which more indoor units of one or more indoor units perform the cooling operation is defined as a cooling-main operation and an operation mode in which more indoor units of one or more indoor units perform the heating operation is defined as a heating-main operation.

The distribution unit 12 is an apparatus for distributing refrigerant discharged from the outdoor unit 11 to the one or more indoor units 13, 14 and 15 or supplying refrigerant discharged from the one or more indoor units 13, 14 and 15 to the outdoor unit 11. Specifically, the distribution unit 12 may be connected to the outdoor unit through three pipes.

The three pipes 16, 17 and 18 may include a high-pressure pipe 16, a low-pressure pipe 17 and a liquid pipe 18. The high-pressure pipe 16 refers to a pipe, through which refrigerant flows in a high-temperature, high-pressure gaseous state before refrigerant is compressed in the compressor and then introduced into the condenser. The low-pressure pipe 17 refers to a pipe, through which refrigerant flows in a low-temperature, low-pressure gaseous state until refrigerant is introduced into the compressor after being evaporated in the evaporator. In addition, the liquid pipe 18 refers to a pipe, through which high-temperature, high pressure liquid refrigerant condensed by the condenser flows.

The prior art related to the structure of the distribution unit of the air conditioning system is as follows.

1. Korean Unexamined Patent Publication No. 10-2003-0024916 (Publication date: Oct. 28, 2004), Title of the Invention: Simultaneous cooling-heating multiple type air conditioner for home use Such a conventional air conditioning system has the following problems. First, if all or some of one or more indoor units of the conventional air conditioning system perform a cooling operation, in a process of supplying high-temperature, high-pressure liquid refrigerant supplied from the outdoor unit to the distribution unit through the liquid pipe having a large length, pressure loss is generated in the liquid pipe to convert some of the liquid refrigerant into gaseous refrigerant. Therefore, noise may occur in the indoor unit due to collision between the liquid refrigerant and the gaseous refrigerant.

Second, if all or some of the one or more indoor units of the conventional air conditioning system perform a heating operation, when the degree of supercooling of the liquid refrigerant is insufficient, some of the liquid refrigerant is converted into the gaseous refrigerant while passing through the liquid pipe. Therefore, it is difficult to perform a normal movement cycle due to shortage of the liquid refrigerant.

An object of the present invention devised to solve the problem lies in an air conditioning system capable of efficiently controlling an opening degree of a supercooling expansion device based on the degree of supercooling of a liquid pipe in a distribution unit. In particular, if control of the opening degree of the supercooling expansion device is not precise, the value of the degree of supercooling of the liquid refrigerant passing through a supercooling heat exchanger becomes insufficient and the liquid refrigerant flows into one or more indoor unit in an abnormal state.

Another object of the present invention is to provide an air conditioning system capable of preventing thermal efficiency from being lowered due to shortage of refrigerant. In addition, another object of the present invention is to provide an air conditioning system capable of preventing noise from occurring due to collision between refrigerants in an abnormal state in an indoor unit.

The object of the present invention can be achieved by providing an air conditioning system including a distribution unit. The distribution unit includes a supercooling heat exchanger disposed between the liquid pipe and the indoor unit such that liquid refrigerant passing through the liquid pipe flows therethrough, a supercooling expansion device connected to the supercooling heat exchanger to adjust an opening degree in order to increase or decrease a degree of supercooling of the liquid refrigerant passing through the supercooling heat exchanger, a temperature sensor for measuring a temperature of the liquid refrigerant introduced into the distribution unit through the liquid pipe, and a pressure sensor for measuring pressure of the liquid refrigerant introduced into the distribution unit through the liquid pipe.

The air conditioning system may further include a controller for controlling the opening degree of the supercooling expansion device based on information sensed by the temperature sensor or the pressure sensor. The controller may determine a difference between a saturation temperature of a pressure value measured by the pressure sensor and the temperature measured by the temperature sensor as the degree of supercooling of the liquid refrigerant, and compare the degree of supercooling with a target degree of supercooling to control the supercooling expansion device.

The controller may decrease the opening degree of the supercooling expansion device if the degree of supercooling is greater than the target degree of supercooling and increase the opening degree of the supercooling expansion device if the degree of supercooling is less than the target degree of supercooling. The distribution unit may include a main flow passage for introducing the liquid refrigerant introduced through the liquid pipe into the supercooling heat exchanger and a branch flow passage for introducing the liquid refrigerant introduced through the liquid pipe into the supercooling expansion device, and refrigerant of the main flow passage and refrigerant of the branch flow passage may exchange heat with each other in the supercooling heat exchanger.

The distribution unit may further include a header connected to the liquid pipe, and the main flow passage and the branch flow passage may extend from an outlet side of the header such that refrigerant in the header is branched into the main flow passage and the branch flow passage. The air conditioning system may further include a discharge flow passage extending from an outlet side of the supercooling heat changer to discharge refrigerant of the branch flow passage, and the discharge flow passage may be discharged to the low-pressure pipe through the header.

The distribution unit may further include a low-pressure valve disposed between the low-pressure pipe and the indoor unit to control the amount of first gaseous refrigerant flowing from the indoor unit to the low-pressure pipe.

The distribution unit may further include a low-pressure flow passage extending from the low-pressure pipe, having the first gaseous refrigerant flowing therein and having the low-pressure valve installed therein. The distribution unit may further include a high-pressure valve disposed between the high-pressure pipe and the indoor unit to control the amount of second gaseous refrigerant flowing from the high-pressure pipe to the indoor unit.

The distribution unit may further include a high-pressure flow passage extending from the high-pressure pipe, having the second gaseous refrigerant flowing therein and having the high-pressure valve installed therein. The outdoor unit may further include an outdoor supercooling heat exchanger disposed at an outlet side of the outdoor heat exchanger to supercool refrigerant condensed in the outdoor heat exchanger.

The indoor unit may include a first indoor unit and a second indoor unit, and the supercooling heat exchanger may include a first supercooling heat exchanger connected to the first indoor unit and a second supercooling heat exchanger connected to the second indoor unit. The outdoor unit may further include an outdoor valve disposed at an outlet side of the outdoor heat exchanger.

The controller may determine a difference between a saturation temperature of the pressure value measured by the pressure sensor and the temperature measured by the temperature sensor as the degree of supercooling of the liquid refrigerant during heating operation, and compare the degree of supercooling with a target degree of supercooling to control an opening degree of the outdoor valve.

The air conditioning system according to the embodiment of the present invention having the above-described configuration has the following effects. First, since the supercooling heat exchanger and the supercooling expansion device are provided in the first liquid pipe of the distribution unit connected to the liquid pipe, it is possible to control the degree of supercooling of the liquid refrigerant introduced into the distribution unit.

Second, the temperature sensor and the pressure sensor are connected to the first liquid pipe of the distribution unit, such that the current degree of supercooling of the liquid refrigerant can be accurately measured through a difference between the temperature value of the liquid refrigerant flowing in the first liquid pipe and the saturation temperature value corresponding to the pressure value of the liquid refrigerant, and the supercooling expansion device is controlled through the measured degree of supercooling to accurately control the degree of supercooling of the liquid refrigerant.

Third, during a cooling operation, since the degree of supercooling of the liquid refrigerant is accurately controlled, gaseous refrigerant is not mixed with the liquid refrigerant flowing in the liquid pipe such that flash gas or pressure loss of refrigerant is not generated. Therefore, noise does not occur due to flow of the liquid refrigerant in the indoor unit.

Fourth, during the cooling operation, the degree of supercooling of the liquid refrigerant is accurately controlled, thereby increasing cooling efficiency. Fifth, during a heating operation, the degree of supercooling of the liquid refrigerant introduced into the outdoor unit is accurately controlled, such that some of the liquid refrigerant is not converted into gaseous refrigerant due to decrease in pressure of the liquid pipe when the refrigerant passes through the liquid pipe having a large length. Accordingly, since normal liquid refrigerant is supplied to the outdoor unit, a normal movement cycle is performed.

Hereinafter, the embodiments of the present invention will be described with reference to the accompanying drawings. The scope of the present invention is not limited to the embodiments and those skilled in the art may readily propose other embodiments within the range of the same idea.

Figure 1:
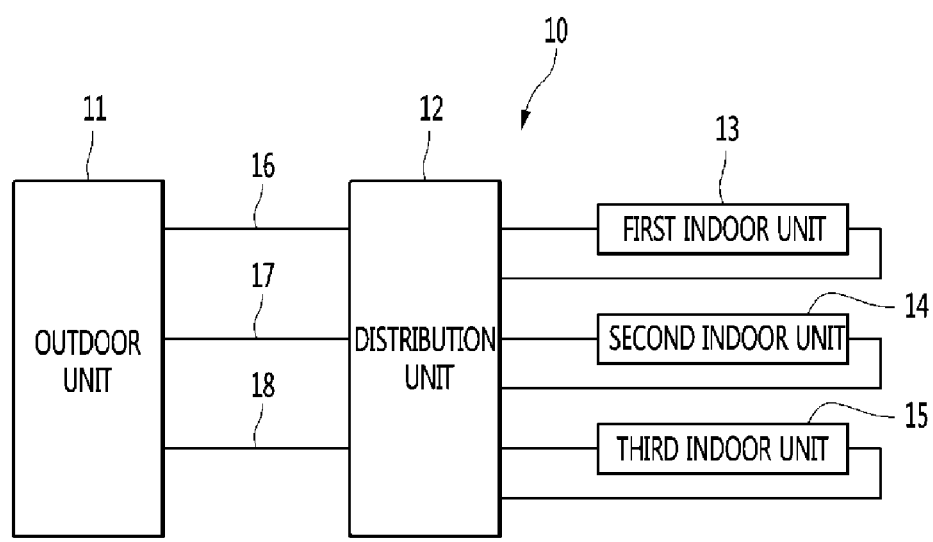
FIG. 1 is a diagram showing the configuration of a conventional air conditioning system.
Figure 2:
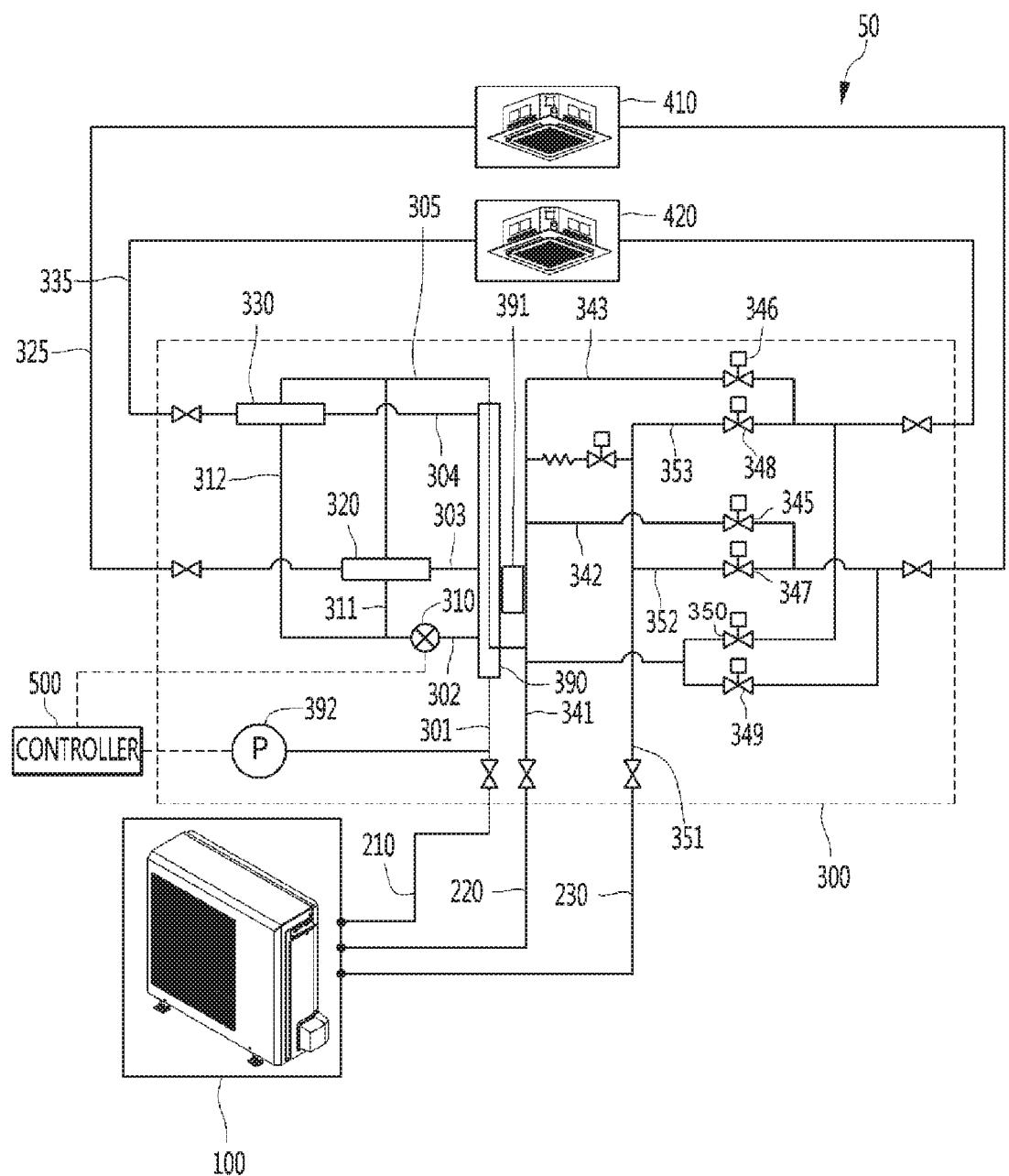
FIG. 2 is a diagram showing the configuration of an air conditioning system according to an embodiment of the present invention.
Figure 3:
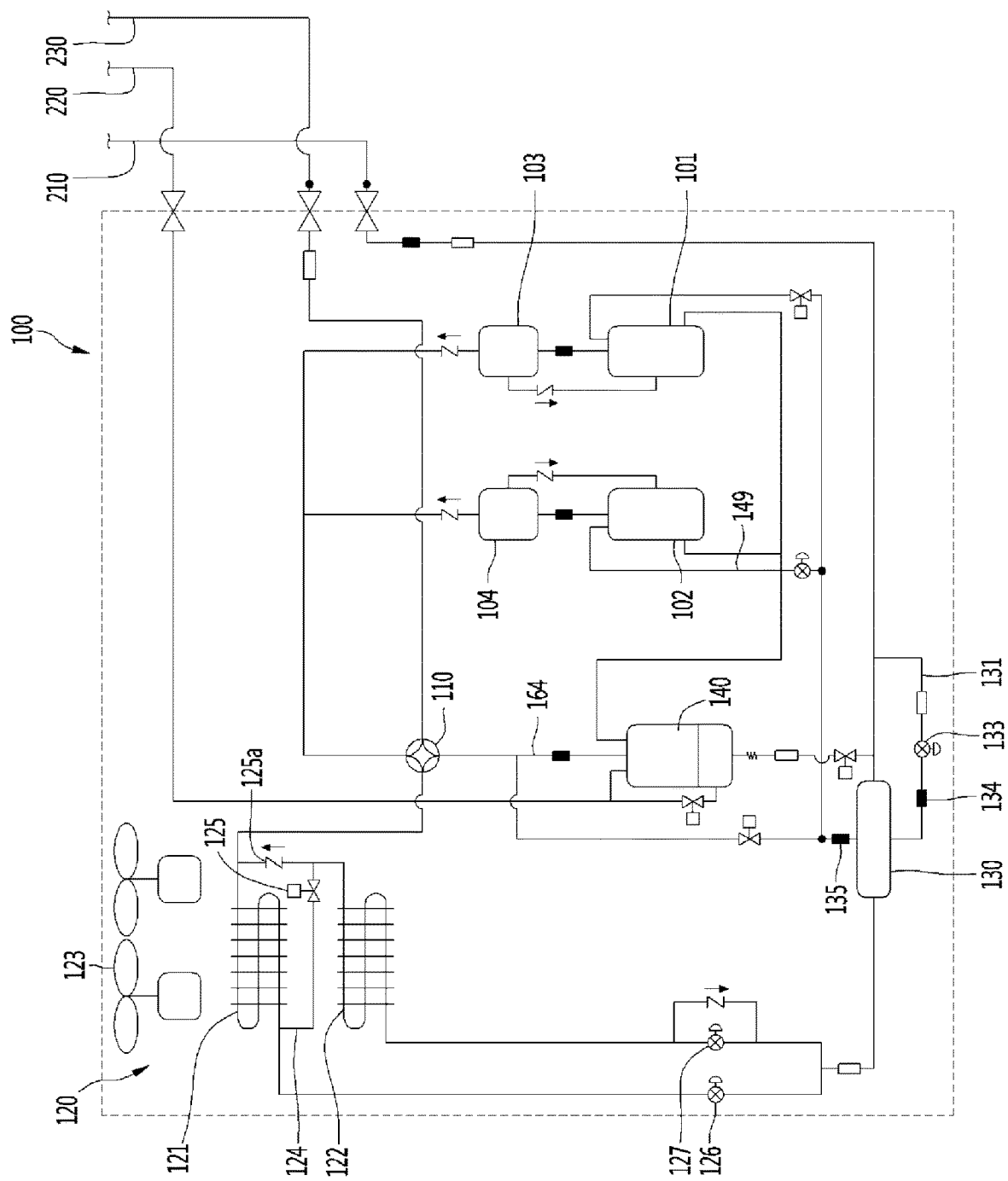
FIG. 3 is a diagram showing the configuration of an outdoor unit in the configuration of the air conditioning system according to the embodiment of the present invention.

FIG. 2 is a diagram showing the configuration of an air conditioning system according to an embodiment of the present invention, and FIG. 3 is a diagram showing the configuration of an outdoor unit in the configuration of the air conditioning system according to the embodiment of the present invention. Referring to FIGS. 2 and 3, the air conditioning system 50 according to the embodiment of the present invention may include an outdoor unit or device 100, a distribution unit (or distributor) 300 and one or more indoor units or devices 410 and 420. For example, the one or more indoor units may include a first indoor unit or device 410 and a second indoor unit or device 420. Although not shown in the figure, each of the indoor units 410 and 420 may include an indoor heat exchanger for performing heat exchange with the air of an indoor space and an expansion device (hereinafter, an indoor expansion device) for expanding refrigerant introduced into the indoor heat exchanger.

The outdoor unit 100 includes a plurality of compressors 101 and 102 and oil separators 103 and 104 disposed at the outlet sides of the plurality of compressors 101 and 102 to separate oil from the refrigerant discharged from the plurality of compressors 101 and 102.

The plurality of compressors 101 and 102 includes a first compressor 101 and a second compressor 102 connected in parallel. For example, when the plurality of compressors 101 and 102 are all driven, the suction-side refrigerant of the plurality of compressors 101 and 102 may be branched into the first compressor 101 and the second compressor 102 to flow therein.

The first compressor 101 may be a main compressor and the second compressor 102 may be a sub compressor. According to system capability, the first compressor 101 may be first driven and, when capability of the first compressor 101 is insufficient, the second compressor 102 may be additionally driven. The oil separators 103 and 104 include a first oil separator 103 disposed at the outlet side of the first compressor 101 and a second oil separator 104 disposed at the outlet side of the second compressor 102.

A flow switching unit or valve 110 for guiding the refrigerant discharged from the compressors 101 and 102 to an outdoor heat exchange device (or heat exchanger) 120 or the indoor unit is provided at the outlet sides of the oil separators 103 and 104. When the air conditioning system performs cooling operation, the refrigerant is introduced from the flow switching unit 110 to the outdoor heat exchange device 120. In contrast, when the air conditioning system performs heating operation, the refrigerant flows from the flow switching unit 110 to the indoor heat exchanger of the indoor unit.

The outdoor heat exchange device 120 includes a plurality of heat exchanging parts (or heat exchanger) 121 and 122 and an outdoor fan 123. The plurality of heat exchanging parts 121 and 122 includes a first heat exchanging part (or first heat exchanger) 121 and a second heat exchanging part (or second heat exchanger) 122 connected in parallel. During heating operation, refrigerant heat-exchanged in the plurality of heat exchanging parts 121 and 122 may be combined and introduced into the flow switching unit 110.

Hereinafter, cooling operation of the air conditioning system will be focused upon. The outdoor heat exchange device 120 includes a variable flow passage 124 for guiding flow of refrigerant from the outlet side of the first heat exchanging part 121 to the inlet side of the second heat exchanging part 122. The variable flow passage 124 extends from the outlet-side pipe of the first heat exchanging part 121 to the inlet-side pipe of the second heat exchanging part 122.

The outdoor heat exchange device 120 is provided with a variable valve 125 provided in the variable flow passage 124 to selectively block flow of refrigerant. Depending on whether the variable valve 125 is turned on/off, the refrigerant passing through the first heat exchanging part 121 may be selectively introduced into the second heat exchanging part 122.

Specifically, when the variable valve 125 is turned on, the refrigerant passing through the first heat exchanging part 121 is introduced into the second heat exchanging part 122 through the variable flow passage 124. At this time, a first outdoor valve 126 provided at the outlet side of the first heat exchanging part 121 may be closed.

In addition, a second outdoor valve 127 is provided at the outlet side of the second heat exchanging part 122, and the refrigerant heat-exchanged in the second heat exchanging part 122 may be introduced into a supercooling heat exchanger 130 through the opened second outdoor valve 127. In contrast, when the variable valve 125 is turned off, the refrigerant passing through the first heat exchanging part 121 may be introduced into the supercooling heat exchanger 130 through the first outdoor valve 126.

The first outdoor valve 126 and the second outdoor valve 127 may be disposed in parallel in correspondence with the first and second heat exchanging parts 121 and 122. For example, each of the first outdoor valve 126 and the second outdoor valve 127 may include an electric expansion valve.

A check valve 125*a* for guiding one-direction flow of refrigerant may be provided at the inlet side of the second heat exchanging part 122. The check valve 125*a* restricts flow of the refrigerant from the flow switching unit 110 to the second heat exchanging part 122. In contrast, during the heating operation of the air conditioning system, the refrigerant heat-exchanged in the second heat exchanging part 122 may be introduced into the flow switching unit 110 through the check valve 125*a*.

The supercooling heat exchanger 130 is disposed at the outlet side of the outdoor heat exchange device 120. During the cooling operation of the air conditioning system, the refrigerant passing through the outdoor heat exchange device 120 may be introduced into the supercooling heat exchanger 130. The supercooling heat exchanger 130 may be referred to as an "outdoor supercooling heat exchanger" in order to be distinguished from the supercooling heat exchanger provided in the distribution unit 300.

The supercooling heat exchanger 130 may be understood as an intermediate heat exchanger for performing heat exchange with respect to liquid refrigerant circulating in a refrigerant system and some (separated refrigerant) of the refrigerant after being branched. The outdoor unit 100 includes a supercooling flow passage 131 for branching the separated refrigerant. The supercooling flow passage 131 is provided with a supercooling expansion device 133 for depressurizing the separated refrigerant. The supercooling expansion device 133 may include an electric expansion valve (EEV).

The supercooling flow passage 131 is provided with a plurality of supercooling sensors 134 and 135. The plurality of supercooling sensors 134 and 135 includes a first supercooling sensor 134 for sensing the temperature of the refrigerant before being introduced into the supercooling heat exchanger 130 and a second supercooling sensor 135 for sensing the temperature of the refrigerant after passing through the supercooling heat exchanger 130.

Based on the temperature values of the refrigerant respectively sensed by the first supercooling sensor 134 and the second supercooling sensor 135, a "degree of supercooling" may be recognized. For example, a value obtained by subtracting the temperature value sensed by the second supercooling sensor 135 from the temperature value sensed by the first supercooling sensor 134 may be recognized as the "degree of supercooling".

The separated refrigerant heat-exchanged in the supercooling heat exchanger 130 may be introduced into a gas-liquid separator 140. The gas-liquid separator 140 is configured to separate gaseous refrigerant before the refrigerant is introduced into the compressors 101 and 102. Specifically, the gaseous refrigerant of the refrigerant introduced into the gas-liquid separator 140 through a low-pressure flow passage 164 may be sucked into the compressors 101 and 102 through a suction flow passage 149. The pressure (hereinafter, suction pressure) of the refrigerant sucked into the compressors 101 and 102 is low.

Meanwhile, the liquid refrigerant passing through the supercooling heat exchanger 130 may be introduced into the indoor unit through a liquid pipe 210. The present embodiment shows the configuration of the outdoor unit 100 and the distribution unit 300 when the air conditioning system can perform simultaneous cooling-heating operation and cooling- or heating-only operation.

The air conditioning system may further include three connection pipes for connecting the outdoor unit 100 and the distribution unit 300. Specifically, the three connection pipes may include a liquid pipe 210, a low-pressure pipe 220 and a high-pressure pipe 230.

The liquid pipe 210 refers to a pipe, through which the liquid refrigerant flows. Specifically, the liquid pipe performs a function for receiving high-pressure liquid refrigerant from the outdoor unit 100 such that the liquid flows, when all or some of the one or more indoor units perform a cooling operation, and performs a function for receiving low-pressure liquid refrigerant from the indoor unit and supplying the liquid refrigerant to the outdoor unit 100, when all or some of the one or more indoor units perform a heating operation.

The low-pressure pipe 220 is a pipe, through which low-pressure gaseous refrigerant (first gaseous refrigerant) flows. Specifically, the low-pressure pipe is a pipe, through which refrigerant evaporated in the evaporator of the indoor unit flows in a gaseous state until being introduced into the compressor of the outdoor unit 100, when all or some of the one or more indoor units performs the cooling operation.

The high-pressure pipe 230 is a pipe, through which high-pressure gaseous refrigerant (second gaseous refrigerant) flows. Specifically, the high-pressure pipe is a pipe, through which refrigerant compressed by the compressor flows in a gaseous state until being introduced into the indoor heat exchanger provided in the one or more indoor units, when all or some of the one or more indoor units performs the heating operation.

The distribution unit 300 may be disposed between the outdoor unit 100 and the one or more indoor units to distribute and introduce refrigerant into the one or more indoor units. Although one or more indoor units are divided into a first indoor unit and a second indoor unit in the following description, the present invention is not limited thereto and the number of indoor units may be changed.

Hereinafter, the configuration of the distribution unit 300 will be described in detail. The distribution unit 300 may include a temperature sensor 391 for measuring the temperature of the liquid refrigerant flowing in the liquid pipe 210, a pressure sensor 392 for measuring the pressure of the liquid pipe 210, one or more supercooling heat exchangers and a supercooling expansion device 310 for supercooling the supplied liquid refrigerant. Based on refrigerant flow, the temperature sensor 391, the pressure sensor 392, the one or more supercooling heat exchanger and the supercooling expansion device 310 may be disposed between the liquid pipe 210 and the indoor units 410 and 420.

The air conditioning system 50 further includes a controller 500 for controlling an operation (or opening degree) of the supercooling expansion device 310 based on the temperature (pressure) information sensed by the temperature sensor 391 or the pressure sensor 392. The distribution unit 300 may include one or more low-pressure valves disposed between the low-pressure pipe 220 and the indoor units 410 and 420 and one or more high-pressure valves disposed between the high-pressure pipe 230 and the indoor units 410 and 420.

The one or more supercooling heat exchangers, one or more low-pressure valves and one or more high-pressure valves corresponding in number to the number of one or more indoor units 410 and 420 may be formed. In the present embodiment, the first indoor unit 410 and the second indoor unit 420 are included, and the one or more supercooling heat exchangers may include a first supercooling heat exchanger 320 and a second supercooling heat exchanger 330. The one or more low-pressure valves may include a first low-pressure valve 345 and a second low-pressure valve 346, and the one or more high-pressure valves may include a first high-pressure valve 347 and a second high-pressure valve 348.

The distribution unit 300 includes a first liquid pipe 301 connected to the liquid pipe 210. The liquid refrigerant introduced into the first liquid pipe 301 of the distribution unit 300 through the liquid pipe 210 may be branched into the first and second supercooling heat exchangers 320 and 330 and the supercooling expansion device 310. Specifically, the liquid refrigerant introduced into the distribution unit 300 through the liquid pipe 210 is branched from the first liquid pipe 301 into a first separation liquid pipe 303, a second separation liquid pipe 304 and a third separation liquid pipe 302.

The distribution unit 300 includes a header 390. The first liquid pipe 301 is connected to the inlet side of the header 390 and refrigerant flows into the header 390 through the first liquid pipe 301. The first to third separation liquid pipes 302, 303 and 304 are connected to the outlet side of the header 390. The refrigerant in the header 390 may be branched into the first to third separation liquid pipes 302, 303 and 304, thereby being discharged.

The first and second separation pipes 303 and 304 may be referred to as a main flow passage for supplying liquid refrigerant to be supercooled to the first and second supercooling heat exchangers 320 and 330. The third separation liquid pipe 302 may be referred to as a branch flow passage for supplying depressurized refrigerant to the first and second supercooling heat exchangers 320 and 330.

Specifically, the first separation liquid pipe 303 is disposed at the inlet side of the first supercooling heat exchanger 320 and some of the liquid refrigerant (first liquid refrigerant) branched from the first liquid pipe 301 or the header 390 may be supplied to the first supercooling heat exchanger 320. The second separation liquid pipe 304 is disposed at the inlet side of the second supercooling heat exchanger 330 and some of the liquid refrigerant (second liquid refrigerant) branched from the first liquid pipe 301 or the header 390 to the second supercooling heat exchanger 330.

The third separation liquid pipe 302 may connect the header 390 and the supercooling expansion device 310 and supply some of the liquid refrigerant branched from the first liquid pipe 301 or the header 390 to the supercooling expansion device 310. In addition, the refrigerant (depressurized liquid refrigerant) depressurized in the supercooling expansion device 310 may be branched and introduced into the first supercooling heat exchanger 320 and the second supercooling heat exchanger 330. The depressurized liquid refrigerant introduced into the first and second supercooling heat exchangers 320 and 330 may exchange heat with the refrigerant introduced into the first and second supercooling heat exchangers 320 and 330 through the first separation liquid pipe 303 and the second separation liquid pipe 304.

The supercooling expansion device 310 may depressurize some (depressurized liquid refrigerant) of the liquid refrigerant branched through the third separation liquid pipe 302. The supercooling expansion device 310 may include an electric expansion valve (EEV).

The supercooling expansion device 310 performs a function for adjusting the degree of supercooling of the liquid refrigerant to be introduced into the indoor unit. Specifically, if the degree of supercooling of the liquid refrigerant passing through the first and second supercooling heat exchangers 320 and 330 is greater than a target degree of supercooling, the opening degree of the supercooling expansion device 310 may be decreased to decrease the flow rate of the depressurized liquid refrigerant passing therethrough, thereby decreasing the degree of supercooling of the first liquid refrigerant passing through the first supercooling heat exchanger 320 and the second liquid refrigerant passing through the second supercooling heat exchanger 330.

In contrast, if the degree of supercooling of the liquid refrigerant passing through the first second supercooling heat exchangers 320 and 330 is less than the target degree of supercooling, the opening degree of the supercooling expansion device 310 may be increased to increase the flow rate of the depressurized liquid refrigerant passing therethrough, thereby increasing the degree of supercooling of the first liquid refrigerant and the second liquid refrigerant.

One or more depressurization flow passages for connecting the supercooling expansion device 310 and the first and second supercooling heat exchangers 320 and 330 may be formed. Specifically, the one or more depressurization flow passages may include a first depressurization flow passage 311 for connecting the first supercooling heat exchanger 320 and the supercooling expansion device 310 and a second depressurization flow passage 312 for connecting the second supercooling heat exchanger 330 and the supercooling expansion device 310.

The first supercooling heat exchanger 320 performs a function for supercooling the first liquid refrigerant and the second supercooling heat exchanger 330 performs a function for supercooling the second liquid refrigerant. Specifically, the first supercooling heat exchanger 320 and the second supercooling heat exchanger 330 may perform heat exchange between the first liquid refrigerant and the second liquid refrigerant flowing therein and the liquid refrigerant depressurized by the supercooling expansion device 310 to perform supercooling.

The reason why the first liquid refrigerant and the second liquid refrigerant are supercooled through the first supercooling heat exchanger 320 and the second supercooling heat exchanger 330 is because, when liquid refrigerant having an insufficient degree of supercooling is introduced into the indoor unit, some of the liquid refrigerant is in a gaseous state in the refrigerant expansion process of the indoor unit and thus the cooling efficiency of the indoor unit may be lowered and noise occurs due to collision between the liquid refrigerant and the gaseous refrigerant. That is, in order to increase cooling efficiency and to reduce noise, it is necessary to sufficiently secure the degree of supercooling of the liquid refrigerant introduced into the indoor unit.

A first connection flow passage 325, in which the first liquid refrigerant may flow, may be disposed between the first supercooling heat exchanger 320 and the first indoor unit, and a second connection flow passage 335, in which the second liquid refrigerant may flow, may be disposed between the second supercooling heat exchanger 330 and the second indoor unit. In addition, a discharge flow passage 305 for enabling the heat-exchanged depressurized liquid refrigerant to be introduced into the low-pressure pipe 330 may be connected to the first supercooling heat exchanger 320 and the second supercooling heat exchanger 330. Specifically, the discharge flow passage 305 may extend to the low-pressure pipe 220 through the header 390.

The pressure sensor 392 may be installed in the first liquid pipe 301 to measure the pressure of the liquid refrigerant flowing in the first liquid pipe 301, and the temperature sensor 391 may be installed in the first liquid pipe 301 or the header 390 to measure the temperature of the liquid refrigerant flowing in the first liquid pipe 301.

The "degree of supercooling" may be recognized based on the pressure and temperature of the liquid refrigerant respectively sensed by the pressure sensor 392 and the temperature sensor 391. For example, a difference between the temperature value of the liquid refrigerant sensed by the temperature sensor 391 and the saturation temperature value at the pressure of the liquid pipe 210 sensed by the pressure sensor 392 may be recognized as the "degree of supercooling".

Conventionally, a difference between the temperature value (condensing temperature) of the liquid refrigerant condensed in the outdoor unit 100 and the temperature value of the liquid refrigerant flowing in the liquid pipe 210 was recognized as the "degree of supercooling". However, since the length of the liquid pipe 210 between the outdoor unit 100 and the distribution unit 300 is significantly long, the temperature and pressure of the liquid refrigerant may be changed while the liquid refrigerant flows from the outdoor unit 100 to the distribution unit 300 through the liquid pipe 210. Since a difference between the temperature of the liquid refrigerant substantially introduced into the distribution unit 300 and the existing condensing temperature is large, it is impossible to accurately recognize the degree of supercooling.

However, in the present invention, the saturation temperature according to the pressure is calculated through the pressure of the liquid pipe 210 sensed by the pressure sensor 392, the temperature of the liquid refrigerant actually introduced into the distribution unit 300, that is, the temperature value of the temperature sensor 391, is measured, and a difference therebetween is recognized as the "degree of supercooling. Therefore, it is possible to accurately measure the degree of supercooling. As a result, it is possible to adjust the opening degree of the supercooling expansion device 310 (EEV) based on the measured degree of supercooling and to prevent some of the liquid refrigerant introduced into the indoor unit from being converted into the gaseous state.

As described above, one or more low-pressure valves are provided between the low-pressure pipe 220 and the one or more indoor units 410 and 420. Specifically, the low-pressure valve may include a first low-pressure valve 345 and a second low-pressure valve 346.

The distribution unit 300 includes a first low-pressure flow passage 341 extending from the low-pressure pipe 220 and having the first gaseous refrigerant flowing therein. The distribution unit 300 further includes a second low-pressure flow passage 342 extending from the first low-pressure flow passage 341 to the first low-pressure valve 345 and a third low-pressure flow passage 343 extending from the first low-pressure flow passage 341 to the second low-pressure valve 346.

The first low-pressure valve 345 may be disposed between the second low-pressure flow passage 342 and the first indoor unit 410 to control flow of the first gaseous refrigerant flowing between the low-pressure pipe 220 and the first indoor unit 410. The second low-pressure valve 346 may be disposed between the third low-pressure flow passage 343 and the second indoor unit 420 to control flow of the first gaseous refrigerant flowing between the low-pressure pipe 220 and the second indoor unit 420.

One or more high-pressure valves may be provided between the high-pressure pipe 230 and the one or more indoor units. Specifically, the one or more high-pressure valves include a first high-pressure valve 347 and a second high-pressure valve 348.

The distribution unit 300 includes a first high-pressure flow passage 351 extending from the high-pressure pipe 230 and having the second gaseous refrigerant flowing therein. The distribution unit 300 further includes a second high-pressure passage 352 extending from the first high-pressure flow passage 351 to the first high-pressure valve 347 and a third high-pressure flow passage 353 extending from the first high-pressure flow passage 351 to the second high-pressure valve 348.

The first high-pressure valve 347 may be disposed between the second high-pressure flow passage 352 and the first indoor unit 410 to control flow of the second gaseous refrigerant flowing between the high-pressure pipe 230 and the first indoor unit. The second high-pressure valve 348 may be disposed between the third high-pressure flow passage 353 and the second indoor unit 420 to control flow of the second gaseous refrigerant flowing between the high-pressure pipe 230 and the second indoor unit.

The distribution unit 300 may include a liquid refrigerant removal unit disposed between the first high-pressure flow passage 351 and the first low-pressure flow passage 341 to remove liquid refrigerant included in the second gaseous refrigerant flowing therein. Therefore, it is possible to solve a problem that the heating efficiency of the second gaseous refrigerant through the indoor unit is lowered when liquid refrigerant is included in the second gaseous refrigerant during heating operation.

The distribution unit 300 may include one or more equilibrium-pressure valves 349 and 350 disposed between the first low-pressure flow passage 341 and the indoor units 410 and 420 to control the first gaseous refrigerant to flow from the indoor unit to the first low-pressure flow passage 341 in a particular situation.

The particular situation includes the case where the indoor unit changes the operation mode from the cooling operation to the heating operation. In this case, the low-pressure first gaseous refrigerant discharged from the indoor units 410 and 420 and the high-pressure second gaseous refrigerant introduced into the indoor units 410 and 420 may collide to generate noise.

In order to prevent noise, the low-pressure valves 345 and 346 may be turned off and the equilibrium-pressure valves 349 and 350 are turned on, such that the flow passage of the low-pressure first gaseous refrigerant discharged from the indoor units 410 and 420 is changed to the equilibrium-pressure valves 349 and 350 to introduce the refrigerant into the outdoor unit 100, thereby preventing collision between the first gaseous refrigerant and the second gaseous refrigerant. Specifically, the one or more equilibrium-pressure valves 349 and 350 may include a first equilibrium-pressure valve 349 and a second equilibrium-pressure valve 350.

The first equilibrium-pressure valve 349 may be disposed between the first indoor unit 410 and the first low-pressure flow passage 341 and the second equilibrium-pressure valve 350 may be disposed between the second indoor unit 420 and the first low-pressure flow passage 341. In addition, the outlet-side pipe of the first equilibrium-pressure valve 349 and the outlet-side pipe of the second equilibrium-pressure valve 350 may be combined to be connected to the first low-pressure flow passage 341.

Figure 4:
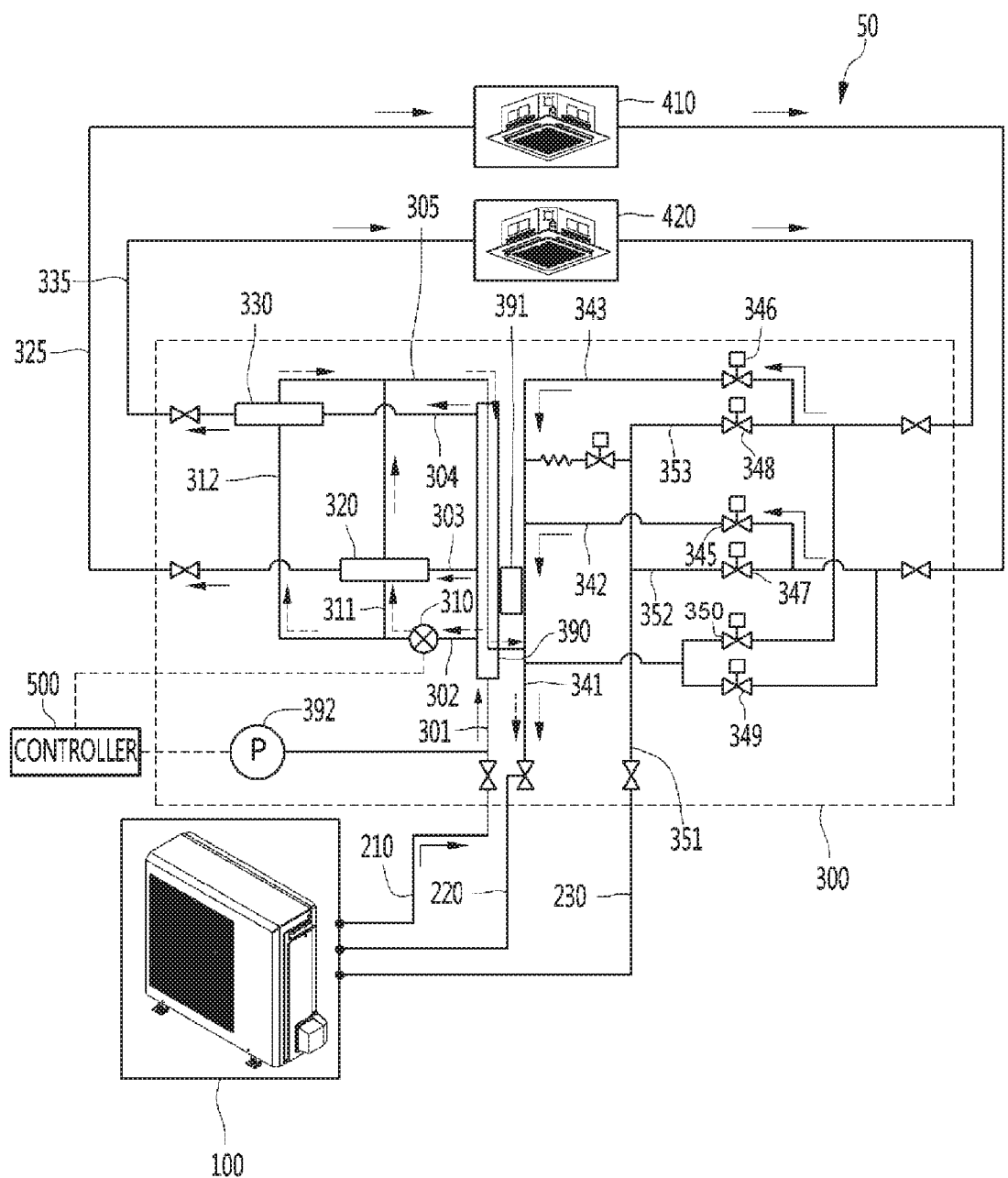
FIG. 4 is a diagram showing a cooling-only operation state of the air conditioning system according to the embodiment of the present invention.

Hereinafter, the cooling-only operation state of the air conditioning system according to the embodiment of the present invention will be described. FIG. 4 is a diagram showing a cooling-only operation state of the air conditioning system according to the embodiment of the present invention.

Referring to FIG. 4, when the air conditioning system performs cooling-only operation, the compressed and condensed high-temperature, high-pressure liquid refrigerant from the outdoor unit 100 is introduced into the distribution unit 300 through the liquid pipe 210. Specifically, the high-temperature, high-pressure liquid refrigerant is introduced into the first liquid pipe 301 through the liquid pipe 210.

The pressure sensor 392 and the temperature sensor 391 measure the pressure and temperature of the liquid refrigerant flowing in the first liquid pipe 301, respectively. In FIG. 4, a solid arrow indicates the flow path of the first liquid refrigerant and the second liquid refrigerant and a dotted arrow indicates the flow path of the depressurized liquid refrigerant branched from the liquid refrigerant.

The first liquid refrigerant of the liquid refrigerant introduced into the first liquid pipe 301 is supplied to the first supercooling heat exchanger 320 through the first separation liquid pipe 303 and the second liquid refrigerant of the liquid refrigerant is supplied to the second supercooling heat exchanger 330 through the second separation liquid pipe 304. The refrigerant supplied to the supercooling expansion device 310 through the third separation liquid pipe 302 of the liquid refrigerant is depressurized while passing through the supercooling expansion device 310.

The depressurized liquid refrigerant, the pressure and temperature of which are lowered by passing through the supercooling expansion device 310, is branched and supplied to the first supercooling heat exchanger 320 and the second supercooling heat exchanger 330 through the first depressurization flow passage 311 and the second depressurization flow passage 312.

Heat exchange is performed between the first liquid refrigerant supplied to the first supercooling heat exchanger 320 and the depressurized liquid refrigerant. Specifically, since the depressurized liquid refrigerant has a lower temperature than the first liquid refrigerant, the temperature of the first liquid refrigerant is decreased and the temperature of the depressurized liquid refrigerant is increased. Therefore, the first liquid refrigerant is supercooled.

In addition, heat exchange is performed between the second liquid refrigerant supplied to the second supercooling heat exchanger 330 and the depressurized liquid refrigerant. Specifically, since the depressurized liquid refrigerant has a lower temperature than the second liquid refrigerant, the temperature of the second liquid refrigerant is decreased and the temperature of the depressurized liquid refrigerant is increased. Therefore, the second liquid refrigerant is supercooled.

In this process, the opening degree of the supercooling expansion device 310 may be adjusted based on the degree of supercooling determined according to the values sensed by the pressure sensor 392 and the temperature sensor 391. If the degree of supercooling is less than the target degree of supercooling, the opening degree of the supercooling expansion device 310 is increased. In contrast, if the degree of supercooling is greater than the target degree of supercooling, the opening degree of the supercooling expansion device 310 is decreased.

The first liquid refrigerant and the second liquid refrigerant supercooled through the first supercooling heat exchanger 320 and the second supercooling exchanger 330 are supplied to the first indoor unit 410 and the second indoor unit 420, and expansion and evaporation occur in the first indoor unit and the second indoor unit, thereby cooling a predetermined space. Meanwhile, the depressurized liquid refrigerant passing through the first supercooling heat exchanger 320 and the second supercooling heat exchanger 330 are combined and discharged to the low-pressure pipe 220 through the discharge flow passage 305 and the first low-pressure flow passage 341 and are supplied to the outdoor unit 100.

In addition, the evaporated low-temperature, low-pressure first gaseous refrigerant is discharged from the first indoor unit and the second indoor unit. Specifically, in the cooling operation state, the first low-pressure valve 345 and the second low-pressure valve 346 are turned on and the first high-pressure valve 347 and the second high-pressure valve 347 are turned off.

Accordingly, the first gaseous refrigerant discharged from the first indoor unit 410 passes through the first low-pressure valve 345 and flows to the low-pressure flow passage 341 through the second low-pressure flow passage 342. In addition, the first gaseous refrigerant discharged from the second indoor unit passes through the second low-pressure valve 346 and flows to the first low-pressure flow passage 341 through the third low-pressure flow passage 343. That is, the first gaseous refrigerant passing through the first indoor unit 410 and the second gaseous refrigerant passing through the second indoor unit 420 may be combined to flow to the first low-pressure flow passage 341 and may be supplied to the outdoor unit 100 through the low-pressure pipe 220.

Figure 5:
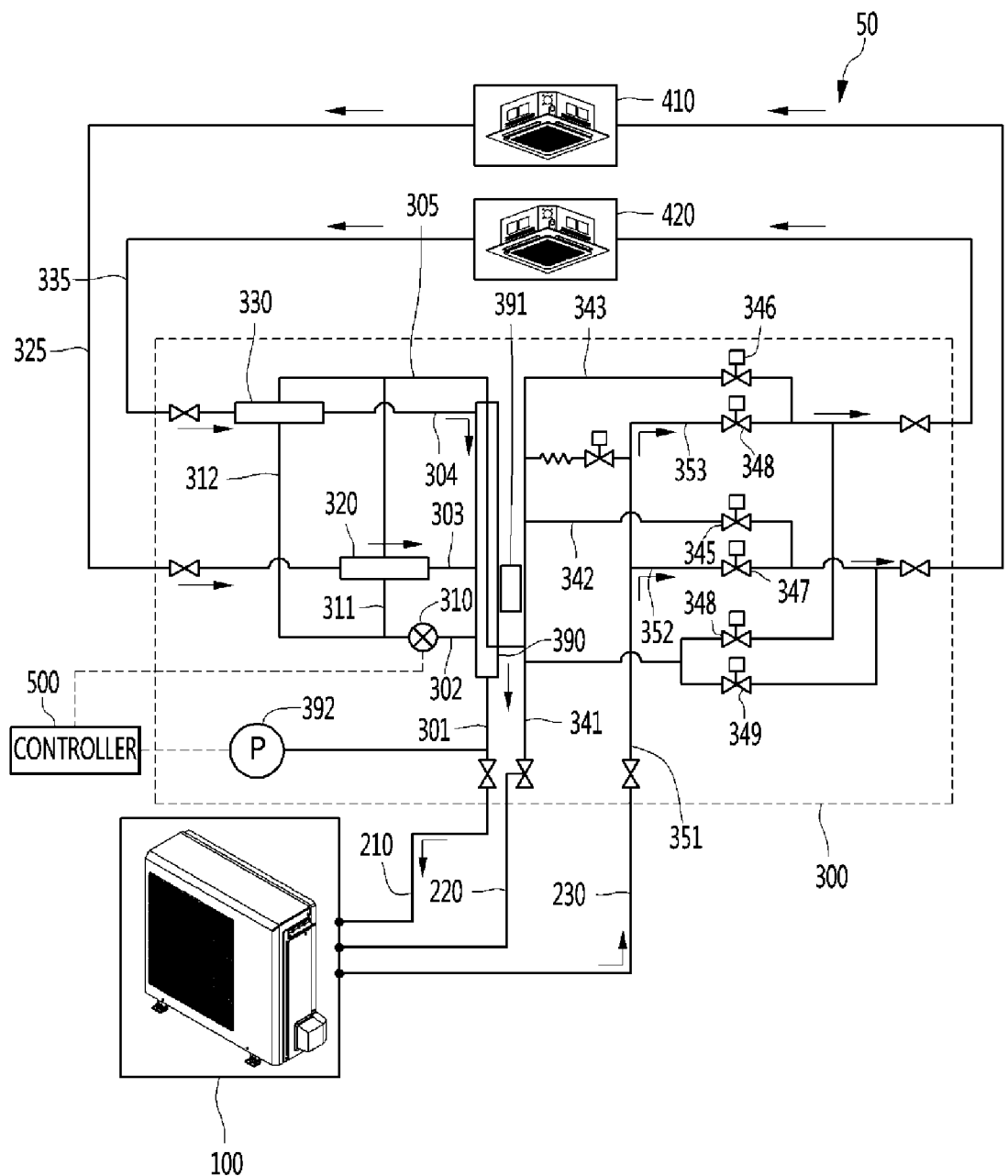
FIG. 5 is a diagram showing a heating-only operation state of the air conditioning system according to the embodiment of the present invention.

Hereinafter, the heating-only operation state of the air conditioning system according to the embodiment of the present invention will be described. FIG. 5 is a diagram showing a heating-only operation state of the air conditioning system according to the embodiment of the present invention.

Referring to FIG. 5, when the air conditioning system performs heating-only operation, the compressed high-temperature, high-pressure second gaseous refrigerant from the outdoor unit 100 is introduced into the distribution unit 300 through the high-pressure pipe 230. Specifically, the high-temperature, high-pressure gaseous refrigerant is supplied to the first high-pressure flow passage 351. In addition, the first high-pressure valve 347 and the second high-pressure valve 348 may be turned on and the first low-pressure valve 345 and the second low-pressure valve 346 may be turned off.

The second gaseous refrigerant flowing to the first high-pressure flow passage 351 is branched into the second high-pressure flow passage 352 and the third high-pressure flow passage 353, and the second gaseous refrigerant flowing to the second high-pressure flow passage 352 is supplied to the first indoor unit 410 through the first high-pressure valve 347. In addition, the second gaseous refrigerant flowing to the third high-pressure flow passage 353 is supplied to the second indoor unit 420. The second gaseous refrigerant is introduced into the first indoor unit 410 and the second indoor unit 420 to perform condensation and expansion, thereby heating a predetermined space. In addition, when heating is finished, the first liquid refrigerant is discharged from the first indoor unit 410 and the second liquid refrigerant is discharged from the second indoor unit 420.

The first liquid refrigerant and the second liquid refrigerant discharged from the first indoor unit 410 and the second indoor unit 420 are introduced into the first supercooling heat exchanger 320 and the second supercooling heat exchanger 330. Meanwhile, since the supercooling expansion device 310 does not operate, the first supercooling heat exchanger 320 and the second supercooling heat exchanger 330 only function as passages. That is, the first liquid refrigerant passes through the first supercooling heat exchanger 320 and the first separation liquid pipe 303, the second liquid refrigerant passes through the second supercooling heat exchanger 330 and the second separation liquid pipe 304, and the first liquid refrigerant and the second liquid refrigerant are combined in the first liquid pipe 301 and introduced into the outdoor unit 100 through the liquid pipe 210.

When the liquid refrigerant, which is a combination of the first liquid refrigerant and the second liquid refrigerant, passes through the first liquid pipe 301, the degree of supercooling of the liquid refrigerant passing through the first liquid pipe 301 is measured by the pressure sensor 392 and the temperature sensor 391. The first outdoor valve 126 and the second outdoor valve 127 of the outdoor unit 100 are controlled by the measured degree of supercooling. For example, if the measured degree of supercooling is less than the target degree of supercooling, the first outdoor valve 126 or the second outdoor valve 127 may be turned off and the opening degree thereof may be decreased, thereby decreasing the amount of refrigerant flowing in the first liquid pipe 301 and the liquid pipe 210.

By such control, since the degree of supercooling of the refrigerant introduced into the outdoor unit 100 through the liquid pipe 210 can be controlled, it is possible to prevent the liquid refrigerant from being separated in the liquid pipe 210 in an abnormal state.

Although one or more indoor units operate in the heating- or cooling-only operation in the above description, the present invention is applicable to the case where a plurality of indoor units is provided and simultaneous cooling-heating operation is performed. In this case, an indoor unit which performs cooling operation may operate by enabling refrigerant to flow equally to flow of refrigerant in the cooling-only operation and an indoor unit which performs heating operation may operate by enabling refrigerant to flow equally to flow of refrigerant in the heating-only operation.

In the embodiments of the present invention, since the supercooling heat exchanger and the supercooling expansion device are provided in the first liquid pipe of the distribution unit connected to the liquid pipe, it is possible to control the degree of supercooling of the liquid refrigerant introduced into the distribution unit. Therefore, industrial applicability is remarkable.

The invention claimed is:

1. An air conditioning system comprising:
an outdoor unit including:
a compressor;
an outdoor heat exchanger connected to the compressor; and
an outdoor supercooling heat exchanger provided at an outlet side of the outdoor heat exchanger to supercool refrigerant condensed in the outdoor heat exchanger;
an indoor unit including:
an indoor heat exchanger; and
an indoor expansion device;
a distributor that connects the outdoor unit with the indoor unit and distributes refrigerant to the indoor unit; and
a connection pipe that connects the outdoor unit with the distributor and includes:
a liquid pipe through which high-pressure liquid refrigerant flows;
a low-pressure pipe through which a first gaseous refrigerant flows; and
a high-pressure pipe through which a second gaseous refrigerant flows,
wherein the distributor includes:
a first liquid pipe connected to the liquid pipe;
a header connected to the first liquid pipe;
a first separation liquid pipe extending from the header and through which the high-pressure liquid refrigerant flows from the header;
a supercooling heat exchanger connected to an outlet end of the first separation liquid pipe;
a connection flow passage connecting the supercooling heat exchanger and the indoor unit;
a second separation liquid pipe extending from the header and through which the high-pressure liquid refrigerant flows from the header;
a supercooling expansion device connected to an end of the second separation liquid pipe to depressurize the high-pressure liquid refrigerant flowing through the second separation liquid pipe;
a depressurization flow passage connecting the supercooling expansion device and the supercooling heat exchanger;
a discharge flow passage connecting the supercooling heat exchanger and the low-pressure pipe, such that the refrigerant inside the supercooling heat exchanger is discharged to the low-pressure pipe;
a temperature sensor disposed on a flow passage in which the high-pressure liquid refrigerant flows, to detect a temperature of the liquid refrigerant which is supercooled by passing through the supercooling heat exchanger;
a pressure sensor disposed on the first liquid pipe in which the high-pressure liquid refrigerant flows, to detect a pressure of the liquid refrigerant introduced into the distributor through the first liquid pipe; and
a controller configured to control the opening degree of the supercooling expansion device based on the temperature sensed by the temperature sensor and the pressure sensed by the pressure sensor,
wherein a flow passage that connects the first separation liquid pipe and the connecting flow passage is defined as a main flow passage, and a flow passage that connects the second separation liquid pipe and the depressurization flow passage is defined as a branch flow passage, and
wherein the refrigerant flowing along the main flow passage and the refrigerant flowing along the branch flow passage exchange heat with each other in the supercooling heat exchanger without mixing.

2. The air conditioning system according to claim 1, wherein the refrigerant in the discharge flow passage is discharged to the low-pressure pipe through the header.

3. The air conditioning system according to claim 1, wherein the indoor unit includes a first indoor device and a second indoor device, and wherein the supercooling heat exchanger includes:
a first supercooling heat exchanger device connected to the first indoor device; and
a second supercooling heat exchanger device connected to the second indoor device.

4. The air conditioning system according to claim 1, wherein during a cooling operation, the controller determines the degree of supercooling of the liquid refrigerant using a difference between a saturation temperature of the pressure sensed by the pressure sensor and the temperature sensed by the temperature sensor, and compares the degree of supercooling of the liquid refrigerant with a target degree of supercooling to control the supercooling expansion device.

5. The air conditioning system according to claim 4, wherein the controller decreases the opening degree of the supercooling expansion device if the degree of supercooling of the liquid refrigerant is greater than the target degree of supercooling, and increases the opening degree of the supercooling expansion device if the degree of supercooling of the liquid refrigerant is less than the target degree of supercooling.

6. The air conditioning system according to claim 1, wherein the distributor further includes at least one low-pressure valve provided between the low-pressure pipe and the indoor unit to control an amount of the first gaseous refrigerant flowing from the indoor unit to the low-pressure pipe.

7. The air conditioning system according to claim 6, wherein the distributor further includes at least one low-pressure flow passage extending from the low-pressure pipe and in which the first gaseous refrigerant flows, wherein the at least one low-pressure valve is installed in the low-pressure flow passage.

8. The air conditioning system according to claim 1, wherein the distributor further includes at least one high-pressure valve provided between the high-pressure pipe and the indoor unit to control an amount of the second gaseous refrigerant flowing from the high-pressure pipe to the indoor unit.

9. The air conditioning system according to claim 8, wherein the distributor further includes at least one high-pressure flow passage extending from the high-pressure pipe, having the second gaseous refrigerant flowing therein and having the at least one high-pressure valve installed therein.

10. The air conditioning system according to claim 1, wherein the outdoor unit further includes at least one outdoor valve provided at an outlet side of the outdoor heat exchanger.

11. The air conditioning system according to claim 10, wherein during a heating operation, the controller determines the degree of supercooling of the liquid refrigerant using a difference between a saturation temperature of the pressure sensed by the pressure sensor and the temperature sensed by the temperature sensor, and compares the degree of supercooling of the liquid refrigerant with a target degree of supercooling to control an opening degree of the outdoor valve.

\* \* \* \* \*